Sept. 24, 1963

G. E. KELLOGG ET AL 3,104,590

POWER OPERATED THROTTLE

Filed May 11, 1961

INVENTORS
George E. Kellogg
Thomas D. Naismith

BY *Arthur L. Nelson*

THEIR ATTORNEY

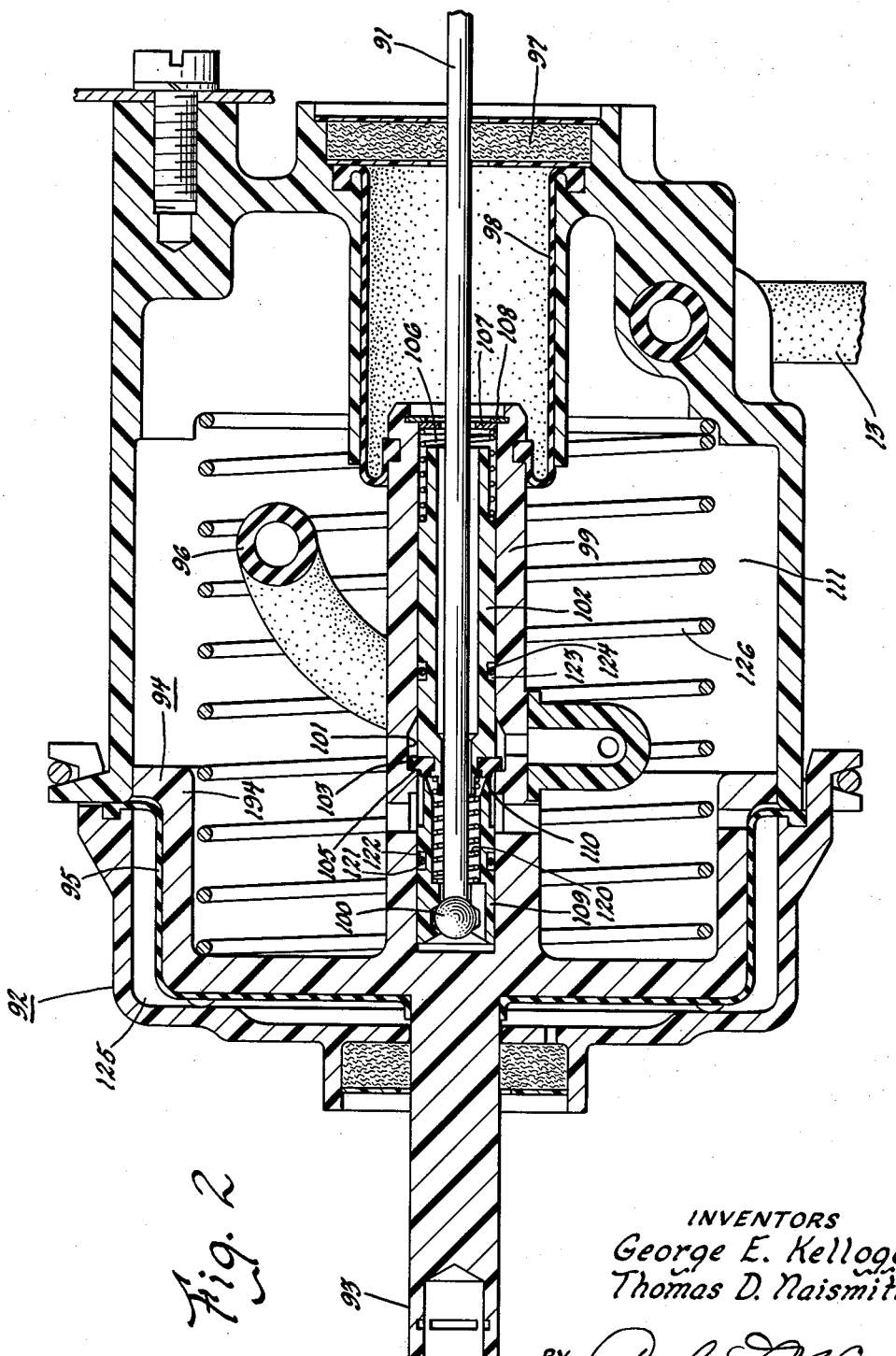

United States Patent Office 3,104,590
Patented Sept. 24, 1963

3,104,590
POWER OPERATED THROTTLE
George E. Kellogg, Miamisburg, and Thomas D. Naismith, Dayton, Ohio, assignors to General Motors Corporation, Detroit, Mich., a corporation of Delaware
Filed May 11, 1961, Ser. No. 109,414
2 Claims. (Cl. 91—376)

This invention relates to a throttle actuating means and more particularly to a limited movement power operated throttle control.

The present day motor vehicle employs a power unit requiring a limited amount of pedal travel for actuation of the vehicle brakes. The throttle lever is generally actuated by the same foot as the vehicle brake. For this reason it is advisable to limit the movement of the foot actuating the throttle and the brake and thereby require merely a pivoting action on the heel of the operator's foot to switch from the actuator pedal to the brake pedal and vice versa. With this type of operation it is unlikely that the operator would catch his foot on the back side of either pedal in swinging the foot from one pedal to the other.

It is an object of this invention to provide a limited movement manual control for actuating a vacuum operated booster unit controlling the throttle valve for a motor vehicle.

It is a further object of this invention to provide a manual control pedal operating through a mechanical disadvantage to directly control a booster unit operating the throttle valve on the motor vehicle.

The objects of this invention are accomplished by employing a throttle pedal supporting on the floor board operating at a mechanical disadvantage through a mechanism directly connected to the control elements of the booster unit. The mechanical disadvantage of the mechanism reduces the movement required by a manual control means and yet provides a directly connected control on the booster unit. The power unit provides the movement to actuate the throttle control valve on the carburetor of a motor vehicle. This type of a mechanism reduces movement of the manual control means to a minimum and yet delivers the required power and movement to actuate the throttle valve. The mechanism also has an infinite number of positions to provide the desired position for the throttle valve during operation of the motor vehicle.

Further objects and advantages of the present invention will be apparent from the following description, reference being had to the accompanying drawings where preferred embodiments of the present invention are clearly shown.

In the drawings:

FIGURE 2 is a cross-section view of the booster unit with the valve means in the hold position.

Figure 1:
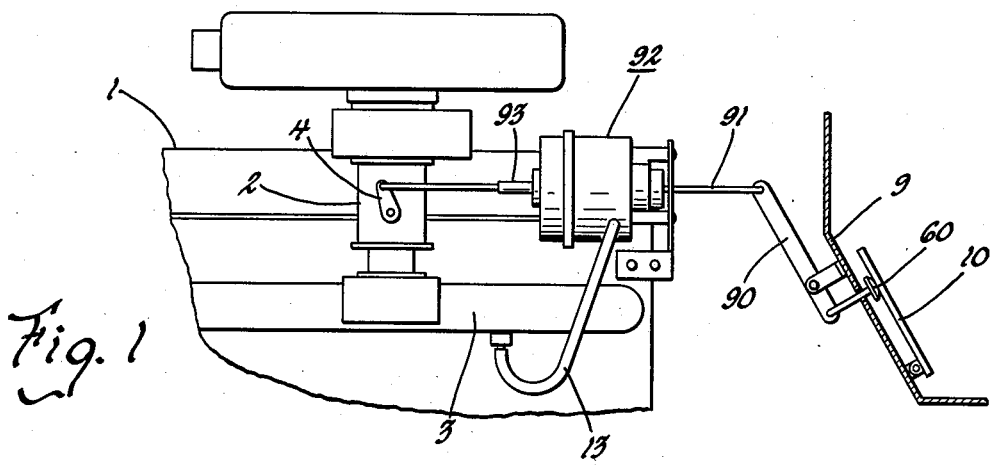
FIGURE 1 is a schematic view employing a manual control means mechanically connected to the power unit.
Figure 3:
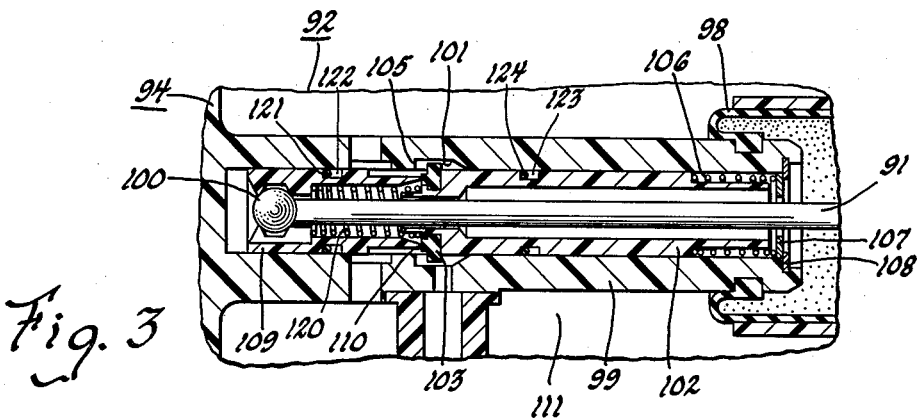
FIGURE 3 is a fragmentary cross-section view of the booster unit illustrated in FIGURE 2 with the vacuum valve open and the air valve closed.
Figure 4:
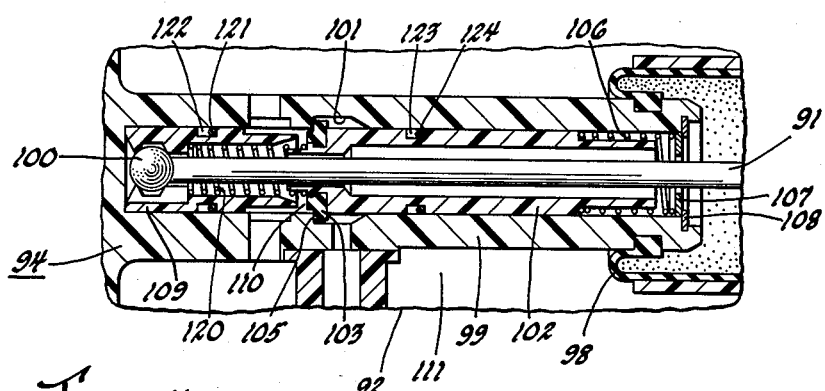
FIGURE 4 is a cross-section view of the valve mechanism as illustrated in FIGURE 2 with the air valve open and the vacuum valve closed.

FIGURES 1, 2, 3 and 4 illustrate the booster unit which is operated by a pull type mechanism connected to a throttle pedal. The throttle pedal 10 is pivotally mounted on the floor board 9 and engages the button 60. The lever 90 is pivotally supported on the floor board 9 and pivotally connected to the link 91. The power unit 92 is connected to the manifold 3 by a vacuum conduit 13. The power unit also has a connector 93 operating the throttle arm 4 on the carburetor 2. The valve mechanism illustrated in FIGURES 3 and 4 is also illustrated in FIGURE 2 with the booster unit 92. The connector 93 extends into the power unit 92 forming the rigid portion 194 of the power wall 94. The link 91 extends into the power unit 92 and operates the valve means concentrically located within the power unit 92. The power wall 94 is sealed on its outer periphery by the diaphragm 95 and also on its inner periphery by the diaphragm 95 fitting the contour of the one side of the power wall 94. The flexible conduit 96 is in communication with the manifold 3. The filter 97 provides a filtering medium for the incoming air from the atmosphere to the valve mechanism. A flexible seal is provided by the diaphragm 98 which engages the filter 97 and the valve housing 99.

The link 91 has a spherical end 100 operating the valve means. The valve housing 99 forms a vacuum valve element 105 by a radial wall on the annular recess 101. The annular recess 101 is in communication with the source of vacuum through the flexible conduit 96 and conduit 13. The sleeve 102 is formed with an annular recess which receives the vacuum valve seat 103. The vacuum valve seat 103 is biased to a normally engaging position on the vacuum valve element 105 by the vacuum valve spring 106. The vacuum valve spring 106 is maintained in its position by the annulus 107 and snap ring 108.

The air valve is mounted concentrically with the vacuum valve and includes the air valve seat 110 which is formed as an integral face on the vacuum valve seat 103. The air valve seat 110 and the vacuum valve seat 103 are formed of a rubber annular ring received within a recess of sleeve 102. The air valve element 109 engages the air valve seat 110 during valve operation. The air valve element 109 is formed of a sleeve with a projecting end which engages the air valve seat 110. The air valve element 109 is operated by the pull rod 91 having the spherical end 100 received within the sleeve 109. The sleeve 102 and the air valve element 109 are biased in spaced relation in their normally retracted position by the air valve spring 120. The normally retracted position is indicated by FIGURE 4. The air valve element 109 and the sleeve 102 engage the inner periphery of the housing 99. An additional feature is indicated between the engaging surfaces of the valve element 109 and the sleeve 102 and the valve housing 99. An annular recess 122 is formed on the outer periphery of the valve element 109. An O-ring 121 is received within the recess 122. The recess however, has a rectangular cross-section with the small dimensions substantially equal to the diameter of the O-ring. With the initial movement of the air valve 109 within the valve housing 99 the O-ring is permitted to roll within the recess 122. The O-ring forms a seal and also operates as a rolling member permitting ease of operation in movement of the air valve element 109 relative to the valve housing 99. An annular recess 123 is also formed on the outer periphery of the sleeve 102. An O-ring 124 is placed within the annular recess 123. The O-ring 124 rolls to provide a bearing and seal arrangement between the sleeve 102 and the valve housing 99. In this manner for the valve element 109 and the sleeve 102 are permitted to move relative to the valve housing 99.

Referring to FIGURE 4 the O-ring 121 is in the righthand position within the recess 122. As the valve element 109 moves to the right the O-ring 121 rolls to a lefthand position in the recess 122. This position is also indicated for the O-ring 124 and the recess 123. The O-rings 121 and 124 are in the lefthand position in FIGURE 3 wherein the sleeve 102 and the valve element 109 are in the righthand position.

The operation of this device will be described in the following paragraphs. As the throttle pedal 10 is depressed the button 60 biases the lever 90 to pull the link 91 outward from the booster unit 92. The link 91 engages the valve element 109 biasing the valve element to an engaging position with the air valve seat 110. This position is indicated in FIGURE 2. In this position the vacuum valve and the air valve are closed and the fluid flow is prevented through either valve.

The unit illustrated is an air suspended unit where an air pressure is present in the variable pressure chamber 111 and the constant pressure chamber 125. A vacuum is present in the flexible conduit 96 and the annular recess 101 about the inner periphery of the valve housing 99. As the valve seat 103 is unseated from the vacuum valve element 105 a vacuum is permitted to be drawn from the variable pressure chamber 111 by the manifold 3. The greater the opening of the vacuum valve the greater the movement of the power wall 94. With the movement of the power wall 94 the rod 93 causes the throttle arm 4 to rotate the throttle valve. So long as the vacuum valve is open the power wall 94 continues to move until the vacuum valve is again closed and the throttle valve is held with this opening. The position of the valves indicated in FIGURE 2 is the hold position for the valves. The power wall 94 may be held in any actuated position in the power unit with both valves closed. The position of the power wall 94 depends upon the amount of vacuum drawn in the variable pressure chamber 111. The power wall 94 moves to equalize the pressure on the forward and rearward sides of the power wall 94 and comes to a rest when the pressures are equalized.

As the throttle pedal 10 is released the vacuum valve is closed and the air valve is opened. The air valve element 109 is permitted to move in spaced relation to the air valve seat 110. In this position the air valve is open and air is permitted to pass through the air valve to the variable pressure chamber 111. The flow of air equalizes the pressure in the variable pressure chamber 111 with the pressure in the constant pressure chamber 125. With the equalization of pressure in the variable pressure chamber 111 and the constant pressure chamber 125 the spring 126 biases the power wall 94 to its normally retracted position as indicated in FIGURE 2.

The throttle pedal 10 moves a relatively smaller distance due to the mechanical disadvantage in the mechanism connecting the pedal 10 to the link 91. The mechanism also provides a direct connection between the valve means and the pedal. This permits manual operation of the engine throttle in the usual manner if vacuum fails to be supplied to the power unit. Such failure may occur due to a rupture of conduit 13, for example. When vacuum is not supplied to the power unit, the unit will fail safe, with the throttle valve being urged toward the closed throttle position so that it is operated in the same manner as throttle mechanisms not equipped with the invention.

While the embodiments of the present invention as herein disclosed, constitutes preferred forms, it is to be understood that other forms might be adopted.

What is claimed is as follows:

1. A throttle control comprising, a power unit housing, a pressure responsive member, means for connecting said pressure responsive member with a throttle valve having open and closed and intermediate positions, means biasing said pressure responsive member toward the closed throttle valve position, a valve means in said pressure responsive member, a pull rod extending through said valve means, said pull rod connecting said valve means to a manually operated mechanism, a constant pressure compartment defined by said pressure responsive member and said power unit housing, a source of vacuum, a variable pressure chamber defined by said pressure responsive member and said power unit housing, conduit means connecting said variable pressure chamber and said source of vacuum; said valve means including, a valve housing formed by said pressure responsive member, a slidable sleeve mounted within said valve housing forming a vacuum valve with said valve housing for admitting vacuum into said variable pressure chamber to urge said pressure responsive member toward the open throttle valve position, means biasing said vacuum valve to a normally closed position, a sliding sleeve connected to said pull rod forming an air valve with said first slidable sleeve, and means biasing said air valve to a normally open position, said slidable sleeve being engageable with said pressure responsive member upon vacuum failure to transmit throttle valve actuating forces received through said pull rod and said sliding sleeve from the manually operated mechanism to said pressure responsive member.

2. A throttle control means comprising, a power unit including a power wall and a housing means receiving said power wall and forming a variable pressure chamber and a constant pressure chamber with said power wall, valve means supported on said power wall, first means for connecting said valve means to a pedal mechanism, second means for connecting a throttle valve adjustably movable to and between open and closed throttle valve positions to said power wall, means biasing said power wall toward the closed throttle valve position, passage means connecting said constant pressure chamber with the atmosphere, conduit means connecting a source of vacuum with said valve means, passage means connecting said valve means with said variable pressure chamber; said valve means including, a valve housing, a sleeve received within said valve housing, a cylindrical air valve element received within said valve housing, a vacuum valve element formed on said valve housing, a vacuum valve seat formed on said sleeve, means biasing said vacuum valve seat to a contacting position with said vacuum valve element, an air valve seat, means biasing said air valve element normally in spaced relation to said air valve seat, an annular recess formed on the outer periphery of said sleeve, an annular recess formed on the outer periphery of said air valve element, an O-ring received within each of said annular recesses to provide a rolling seal as said air valve element and said sleeve are moved relative to said valve housing during valve actuation, said sleeve and said cylindrical air valve element being engageable in force transmitting relation to engage said sleeve with said power wall in force transmitting relation upon vacuum failure and movement of said first connecting means toward the open throttle valve position to provide normal throttle valve control with said power wall biasing means.

References Cited in the file of this patent

UNITED STATES PATENTS

| | | |
|---|---|---|
| 1,404,646 | Prescott | Jan. 24, 1922 |
| 1,777,819 | Williams | Oct. 7, 1930 |
| 1,854,752 | McKee | Apr. 19 1932 |
| 1,864,225 | Williams | June 21, 1932 |
| 2,902,829 | Verbrugge | Sept. 8, 1959 |
| 3,016,881 | Wilkens et al. | June 16, 1962 |